United States Patent [19]

Cameron

[11] Patent Number: 4,704,818

[45] Date of Patent: Nov. 10, 1987

[54] HYDROPONIC GROWING SYSTEM AND STACKABLE MODULAR COMPONENTS THEREOF

[76] Inventor: Murray C. Cameron, 766 George Street, Dunedin, New Zealand

[21] Appl. No.: 826,335

[22] Filed: Feb. 5, 1986

[30] Foreign Application Priority Data

Feb. 13, 1985 [NZ] New Zealand ............... 211107

[51] Int. Cl.⁴ .................................. A01G 31/00
[52] U.S. Cl. ............................. 47/62; 47/48.5; 47/82
[58] Field of Search ............. 47/79, 78, 86.2, 83, 47/86, 62, 64, 65, 48.5

[56] References Cited

U.S. PATENT DOCUMENTS

| 185,468 | 12/1876 | Archer | 47/83 |
|---|---|---|---|
| 262,335 | 8/1882 | Wagner | 47/83 |
| 2,113,523 | 4/1938 | White | 47/33 |
| 3,063,196 | 11/1962 | Pauer | 47/82 |
| 3,375,607 | 4/1968 | Melvold | 47/86 |
| 4,145,841 | 3/1979 | Woolpert | 47/86 |
| 4,218,847 | 8/1980 | Leroux | 47/82 |

FOREIGN PATENT DOCUMENTS

| 231444 | 3/1944 | Switzerland | 47/83 |
|---|---|---|---|
| 2149282 | 6/1985 | United Kingdom | 47/83 |

Primary Examiner—Robert E. Bagwill
Assistant Examiner—Bradley M. Lewis
Attorney, Agent, or Firm—Holman & Stern

[57] ABSTRACT

An assembly of preferably frusto-conical shell like members for use in hydroponic growing of plants have openings in the walls through which plants can grow and a matrix of rooting material within each shell like member into which the plants are inserted and take root. A liquid collection means is disposed below the lower most shell and a liquid introducing means for introducing liquid nutrient is provided near the top of the rooting matrix. The assembly can also incorporate a means for pumping the liquid nutrient from the collection means to the top of the rooting matrix.

15 Claims, 7 Drawing Figures

HYDROPONIC GROWING SYSTEM AND STACKABLE MODULAR COMPONENTS THEREOF

BACKGROUND OF THE INVENTION

1. Field of the Invention

The present invention relates to improvements in and/or relating to hydroponic growing systems and related apparatus, methods of use for such apparatus and the like.

In order to ensure the widespread use of hydroponic systems in other than purely commercial circumstances it is necessary for a system to be both asthetic when in use and convenient to prepare for use and to use. With this therefore in mind and in order also to offer some degree of flexibiliy the present invention relates to improved hydroponic means and methods.

BRIEF SUMMARY OF THE INVENTION

In one aspect of the present invention consists in an assembly of shell like members (preferably substantially of a frusto-conical configuration) having openings passing through the walls thereof through which plants can grow, a matrix of rooting material (preferably in the form of a cartridge or part thereof) disposed within each shell like member and into which any plant inserted through an opening can enter into a root fixing relationship, liquid collection means disposed below the lower most shell member to collect excess liquid nutrient passing through the rooting matrices and liquid nutrient introducing means for introducing liquid nutrient to at least one zone at or towards an upper extremity of the rooting matrix.

"Shell-like" members as used hereinafter means a substantially laminar member of a hollow cross section, e.g. cylindrical, frusto conical or any regular or irregular polygonal shape. The "shell-like" member can be open at the top or bottom or both so as to facilitate the passage of liquids and other substances.

Preferably said number of shells comprises two. In other forms of the present invention a plurality of stacked shell like members can be provided.

Preferably the shell like members are frusto-conical in configuration.

Preferably each shell member includes a peripheral flange to stabilize the stacking thereon so that the larger end of one shell member can be stacked on the smaller end region of another in stable manner.

Preferably the smallest shell member is provided with a top portion.

Preferably the arrangement is such that the smallest shell member can nest inside if desired the next largest shell member.

Preferably the rooting matrix is a cartridge.

Preferably the cartridges disposed within each shell are separate from that disposed within another, or in some forms of the present invention a single cartridge can be provided for a plurality of the stacked shells.

Preferably each cartridge is formed in a substantially frusto-conical shape e.g. by bending even though the same may be molded flat.

Preferably each cartridge includes as a rooting matrix mesh held particulate material, and absorbent material e.g. perlite and sphagnum moss.

Preferably a main mesh or other structrual means is disposed in the body of the cartridge matrix material so as to provide at least one anchoring member top and bottom.

Preferably the body matrix material of each cartridge is surrounded by a fine mesh e.g. of nylon.

Preferably the liquid dispensing means comprises a reservoir into which fluid can be pumped from a collecting container below the lower-most shell member, e.g. by battery, electric or hand operated actuation of the pump.

Preferably the pump uses a riser that passes up centrally through the aligned shells.

Preferably a reservoir is provided into which liquid is pumped and from which it can pass under the effect of gravity at least through conduits to the uppermost regions of the cartridge matrix material.

In a further aspect the present invention may broadly be said to consist in a kit set involving components of an assembly as previously defined.

In yet a further aspect the present invention consists in a method of hydroponic growing involving apparatus and/or systems in accordance with the present invention.

The invention consists in the foregoing and also envisages constructions of which the following gives examples.

BRIEF DESCRIPTION OF THE DRAWINGS

One preferred form of the present invention will now be described with reference to the accompanying drawing wherein.

DETAILED DESCRIPTION

Figure 1:
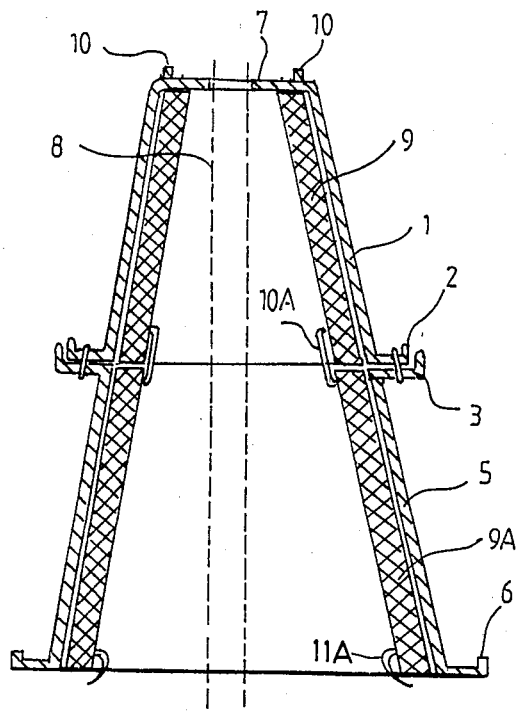
FIG. 1 is a diagrammatic cross-sectional view of a two shell assembly in accordance with the present invention showing one shell stacked above the other and a separate substantially frusto-conical matrix for rooting a plant in each, for simplicity, any permanent openings and cuppings underneath an opening through a shell being omitted.

In the preferred form of the present invention as shown in FIG. 1 a top shell member 1 preferably formed from molded plastics has a plurality of openings in the curved walls thereof (not shown) through which a plant can grow and down through which it can be planted, i.e. bringing its roots into contact with the rooting matrix. The preferred top shell member 1 preferably includes an annular flange arrangement 2 to facilitate stacking thereof onto and fixing to a circular flange 3 of a larger shell member 5 in which it can nest when not being stacked. Preferably the larger shell 5 includes an annular flange arrangement 6 which can if desired be stacked in a similar way to a third shell.

Figure 2:
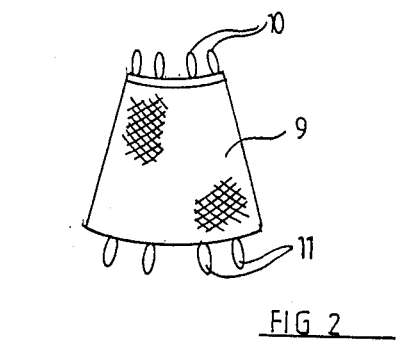
FIG. 2 is a plan view of a flat form of cartridge in accordance with the present invention.

Preferably the top shell member 1 includes a top end portion 7 which not only cuts down evaporation within the system but allows the easy centering of the shaft or plunger tube 8 of a pump and also the fixing of the upper end of top cartridge 9 by means of the protrusions 10 thereof (see FIG. 2).

Figure 3:
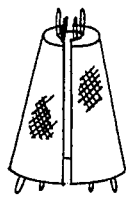
FIG. 3 is a perspective view showing the cartridge of FIG. 2 rolled in substantially frusto-conical form.

Preferably, a cartridge 9 is formed in the shape as shown in FIG. 2 and can be curved into the shape shown in FIG. 3 with portions 10 projecting upwardly and portions 11 projecting downwadly for fixing purposes. The corresponding projections 10A and 11A are shown in relation to the lowermost cartridge 9A.

Preferably the cartridge is formed of a water permeable matrix of particulate perlite and sphagnum moss mounted over or to a substantially plastics mesh material which provides the projections 10 and 11. Preferably the bulk of the water permeable material is held about or to that larger mesh by a smaller mesh material such as a fine nylon mesh which can if desired be simply cut away in rooting regions during any planting operation.

Preferably the top and bottom surfaces of each cartridge are modified so that one indexes into the other. This has not been shown, but a person skilled in the art would appreciate its advantages.

Figure 4A:
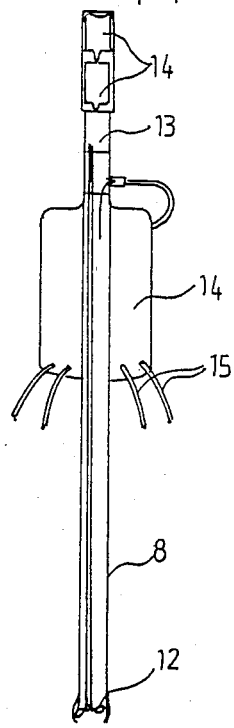
FIG. 4A is a diagrammatic view of a propeller type pump having batteries disposed at the top thereof showing how flow axially up a tube into a reservoir can be provided and from thence via tubes to a position where there is a flow into upper regions of the rooting matrix.

Disposed within the aligned shells which are preferably bolted to each other using the flanges 2 and 3 is a shaft 8 of a pump as shown in FIG. 4A which includes a propeller 12 within the shaft 8 driven, for example, by an electric motor 13 run by batteries 14. The flow of water is in the arrowed direction with water together with nutrients (plus any make up nutrients in water) being stored in a container 14 from when tubes 15 are provided to pass down onto the upper extremities of the cartridge matrix material.

Figure 4B:
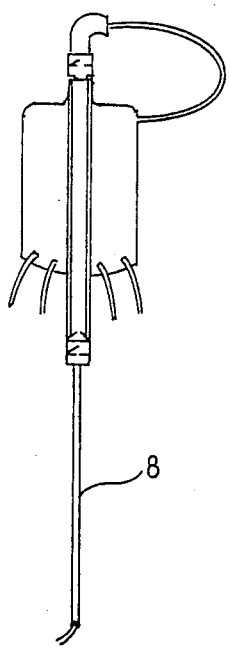
FIGS. 4B and 4C are views similar to FIG. 4A showing a simple plunger type pump in different positions which achieve much the same effect.
Figure 4C:
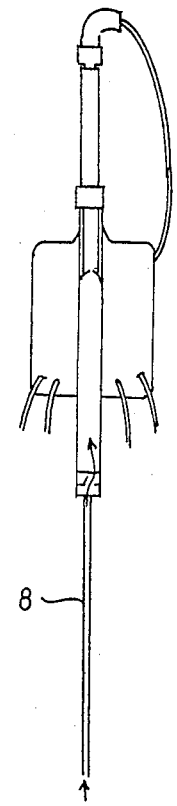

A similar pumping arrangement is obtainable using a plunger pump as shown in FIGS. 4B and 4C.

Figure 5:
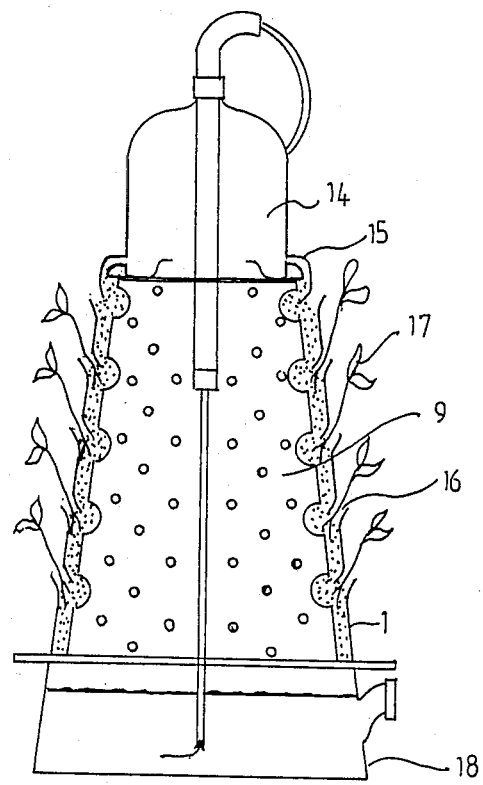
FIG. 5 is a diagrammatic cross-sectional view of an embodiment of the invention in use.

From FIG. 5, it can be seen that in use it is possible for a home grower to take, for example, the top shell member 1, insert a cartridge 9 thereinto and to grow plants 17 through openings 16 in the top shell member, there being a collecting bottom tank or the like for any liquid and nutrients that pass down through the rooting matrix of cartridge 9 and are not taken up by a plant. In the most simple form of the present invention the contents of the collection bottom tank are pumped into a header tank 14 or the like which then over an ensuring cycle allows a steady drip of liquid down in through the rooting matrix to plants 17.

With the present system the upgrading of such a simple system substantially as described in relation to FIG. 1 is simple as it is not necessary to remove the cartridge 9 as a separate cartridge 9A is provided for the shell member 5. Obviously however, a large combined type cartridge could instead be provided if the stacked shell members are to be used fully in their preassembled condition.

It is envisaged that the components of a growing system in accordance with the present invention can be provided or parts can be sold on a one off basis. Obviously while a continuously running pump system makes work minimal a substantially continuously running trickle feed system with periodic refills of the header tank bottle or its equivalent is perfectly adequate.

I claim:

1. A hydroponic planter comprising:
   a plurality of stacked frusto-conical shaped shell members having shell-like walls;
   a plurality of openings in said walls of each shell member through which plants can grow;
   a plurality of hollow, frusto-conical shaped matrices of rooting material stacked to form a frustoconical assembly having an uppermost and a lowermost matrix in substantially close relationship within said stacked shell members so that plants inserted through said openings can enter into a root-fixing relationship in said rooting material and each matrix, except the lowermost matrix, is in a liquid-transferring relationship under gravity with an adjacent matrix, the overall configuration of each matrix being substantially similar to the overall configuration of said shell members adjacent thereto;
   at least one anchoring means at the top and at least one anchoring means at the bottom of each matrix for anchoring each matrix to an adjacent matrix;
   liquid nutrient dispensing means for dispensing liquid nutrient into said rooting material adjacent an upper extremity of the matrix within the uppermost shell member; and
   liquid collection means disposed below the lowermost shell member to collect excess liquid nutrient passing through the rooting material.

2. A planter as claimed in claim 1 and further comprising:
   peripheral flange means on said shell members to faciliate stacking the larger end region of one shell member on the smaller end region of an adjacent shell member in a stabilized manner.

3. A planter as claimed in claim 1 and further comprising:
   a top end portion on the uppermost shell member extending over the upper end of the uppermost matrix.

4. A planter as claimed in claim 1 wherein:
   said stacked shell members are of different sizes so that the smallest shell member is able to nest inside the next larger shell member.

5. A planter as claimed in claim 1 wherein:
   each matrix comprises a separate cartridge for each of said stacked shell members.

6. A planter as claimed in claim 1 wherein:
   each matrix comprises a cartridge body; and
   a reinforcing structural means is disposed in said cartridge body, said at least one anchoring means at the top and bottom of said cartridge body comprising anchoring members formed as part of said reinforcing structural means.

7. A planter as claimed in claim 1 wherein:
   each matrix comprises a cartridge body of said rooting material; and
   each cartridge body is surrounded by a fine mesh of nylon.

8. A planter as claimed in claim 1 wherein said liquid collection means comprises a container and said liquid dispensing means comprises:
   a pump having an inlet and an outlet;
   a reservoir connected to said pump outlet;
   fluid conduit means connecting said container to said pump inlet; and
   means to operate said pump.

9. A planter as claimed in claim 8 wherein said fluid conduit means comprises:
   a riser passing centrally and upwardly through said stacked shell members for faciliating transport of liquid from said container to said reservoir.

10. A planter as claimed in claim 1 wherein said liquid dispensing means comprises:

a reservoir;

means for pumping liquid into said reservoir; and conduits extending from said reservoir to the uppermost regions of said matrix material.

11. A planter as claimed in claim 2 wherein said peripheral flange means comprises:

a planar flange at the larger lower end of the uppermost stacked shell member;

planar flanges at the upper and lower ends of said stacked shell members other than said uppermost shell member;

said planar flanges extending substantially radially with respect to the central axis of said stacked shell members, said lower flanges of each shell member being engageable with said upper flanges of adjacent shell members; and means for releasably retaining said engageable flanges together.

12. A planter as claimed in claim 6 wherein said reinforcing structural means comprises:

a substantially rigid mesh material having discrete projections comprising a plurality of said anchoring members; and further comprising a fine mesh of nylon at least partially surrounding each cartridge body for holding said rooting material in compact engagement with said substantially rigid mesh material.

13. A planter as claimed in claim 9 wherein:

each matrix comprises a separate cartridge for each of said stacked shell-like members.

14. A planter as claimed in claim 13 wherein:

a reinforcing structural means is disposed in each cartridge body; and said at least one anchoring means at the top and bottom of said cartridge body comprises a plurality of anchoring members integral with said reinforcing structural means.

15. A hydroponic planter kitset comprising:

a plurality of vertically stackable frusto-conical shaped shell members having shell-like walls and openings in said walls through which plants can grow, said shell members having relative dimensions so that they can be nested;

a plurality of vertically stackable frusto-conically shaped hollow matrices of rooting material each disposable in substantially close relationship substantially within one of said shell members so that when stacked said matrices form a frusto-conical assembly and any plant inserted through an opening in said one shell member can enter into a root-fixing relationship in the respective adjacent matrix, said matrices having relative dimensions so that they can be nested;

each matrix being in a liquid-transferring relationship under gravity with any adjacent lower matrix;

the overall configuration of each matrix being substantially similar to the overall configuration of the respective ajacent shell member;

liquid nutrient dispensing means for dispensing liquid nutrient to at least one zone adjacent an upper extremity of the rooting material matrix within the uppermost shell member; and liquid collection means disposed below the lowermost shell member to collect excess liquid nutrient passing through the rooting material matrices.

* * * * *